United States Patent [19]

Lieberman et al.

[11] Patent Number: 4,814,128

[45] Date of Patent: Mar. 21, 1989

[54] PROCESS FOR MAKING A HOMOGENEOUS DOPED SILICON NITRIDE ARTICLE

[75] Inventors: Sheldon Lieberman, Burlington; Elizabeth Trickett, Framingham; Sophia R. Su, Weston, all of Mass.

[73] Assignee: GTE Laboratories Incorporated, Waltham, Mass.

[21] Appl. No.: 41,884

[22] Filed: Apr. 23, 1987

Related U.S. Application Data

[63] Continuation of Ser. No. 761,456, Aug. 1, 1985, abandoned.

[51] Int. Cl.$^4$ .............................................. C04B 35/58
[52] U.S. Cl. ...................... 264/65; 501/12; 501/97
[58] Field of Search ...................... 264/65; 501/12, 97

[56] References Cited

U.S. PATENT DOCUMENTS

| | | | |
|---|---|---|---|
| 4,098,612 | 7/1978 | Rhodes et al. | 106/73.2 |
| 4,266,978 | 5/1981 | Prochazka | 106/39.5 |
| 4,286,024 | 8/1981 | Yoldas | 428/446 |
| 4,429,051 | 1/1984 | Davidge et al. | 501/12 |
| 4,443,339 | 4/1984 | Rosevear | 210/635 |
| 4,472,510 | 9/1984 | January | 501/12 |
| 4,501,818 | 2/1985 | Rossi | 501/1 |

FOREIGN PATENT DOCUMENTS

| | | | |
|---|---|---|---|
| 59-195574 | 11/1984 | Japan | 501/12 |

OTHER PUBLICATIONS

Szweda, A. et al, "The Preparation of Silicon Nitride from Silica by Sol-Gel Processing"; Proc. By Ceram. Soc., 1981, 31, No. Spec. Ceram. 7, pp. 107-118.

Shaw, T. M. and Pethica, B., The Preparation and Sintering of Homogeneous Silicon Nitride Gree, Compacts, American Ceramic Society, 1985.

*Primary Examiner*—James Derrington
*Attorney, Agent, or Firm*—Ivan L. Ericson

[57] ABSTRACT

A process for making a homogeneous yttria-alumina doped silicon nitride article is described. A uniform coating of yttria and alumina is applied to the surface of silicon nitride particles by a chemical application of the hydroxides of yttrium and aluminum followed by drying and a subsequent conversion of the hydroxides to the corresponding oxides. The resulting powder is formed into an article and pressureless sintered to a density greater than 99% of theoretical.

5 Claims, No Drawings

PROCESS FOR MAKING A HOMOGENEOUS DOPED SILICON NITRIDE ARTICLE

FIELD OF THE INVENTION

This invention relates to a method of making a ceramic article. More particularly, this invention relates to a method of making a silicon nitride article having homogeneously dispersed sintering additives.

BACKGROUND OF THE INVENTION

A major problem in ceramic processing is the capability of manufacturing reproducible and reliable ceramic materials having the required properties suitable for high technology applications. This lack of reproducibility of material properties lies in the inability to control the development of specified microstructure, which for sintered materials depend on the characteristics of the starting powder, the green compact microstructure, and the sintering and coarsening processes. Although much significant work has been performed on the process which occurs during firing many researchers believe that the microstructure developed during sintering is determined to a large extend by the powder characteristics and the green microstructure. Therefore, the key factor to stronger and more reliable ceramics lies in new processing techniques that would result in fewer of the flaws and voids that lead to failure.

SUMMARY OF THE INVENTION

In accordance with the present invention, a new and improved process for making a silicon nitride article having homogeneously dispersed sintering additives comprises the following steps:

Step 1—Silicon nitride particles are dispersed in a solution of sintering additives to form a silicon nitride, sintering additive slurry.

Step 2—Ammonium hydroxide solution is added to the silicon nitride, sintering additive slurry to form a gel.

Step 3—The product from step 2 is filtered.

Step 4—The product from step 3 is washed with water.

Step 5—The produce from step 4 is dried.

Step 6—The produce from step 5 is calcined at a temperature sufficient to convert the sintering additives to sintering additive oxides.

Step 7—The produce from step 6 is formed into a silicon nitride article.

Step 8—The product from step 7 is pressureless sintered at a temperature sufficient to form a densified silicon nitride article having a density greater than 99 percent of theoretical density.

DETAILED DESCRIPTION OF THE INVENTION

This invention is focused on processing two $Si_3N_4$ based alloys of formulation 6 w/o $Y_2O_3$ designated as PY6 and 6 w/o $Y_2O_3$ and 2 w/o $Al_2O_3$ designated as AY6. This processing technique can be applied to other systems in which oxides are used as sintering additives.

(A) Powder Processing

Colloidal Dispersion

This method is based on the precipitation of aluminum hydroxide and yttrium hydroxide from its corresponding nitrate solution onto dispersed $Si_3N_4$ particles.

EXAMPLE: PREPARATION OF AY6 POWDER 50.89 of premilled silicon nitride powder were dispersed in 99.6 ml of deionized water and 0.4 g of ammonium citrate to form a slurry. 25 ml of a yttrium nitrate stock solution and 25 ml of a aluminum nitrate stock solution were added to the above slurry. The stock solutions were prepared to provide 3.319 g of $Y_2O_3$ as the nitrate and 1.106 g of $Al_2O_3$ as the nitrate. The total volume was increased to 200 ml with deionized water and the slurry was homogenized using an ultrasonic cell disruptor for 30 minutes. 1N $NH_4OH$ was added dropwise to precipitate the hydroxides of yttrium and aluminum. The final pH was 9.0. The final slurry was filtered and washed with deionized water to remove soluble nitrates. The washed filter cake was dried at 110° C. overnight. The dried cake was ball milled 24 hrs. using $Si_3N_4$ milling media. The resulting powder was calcined at 400 to 500° C. to decompose the hydroxides to their corresponding oxides. The morphology of the powder was analyzed by STEM chemical imaging technique. The results indicate that each $Si_3N_4$ particulate was homogeneously coated by sintering additives of oxides. The oxide coating was generally localized on the edge of $Si_3N_4$ particles. The same powder morphology was obtained by partially precipitating out $Al(OH)_3$ and $Y(OH)_3$ from their corresponding nitrate solution by adjusting the pH of the $Si_3N_4$ dispersion to 7.5 to 8.0 followed by calcination at 450° C. for 4 hrs.

EXAMPLE: PREPARATION OF PY6 POWDERS 100 gr. of premilled silicon nitride powder (lot SN66) was dispersed in 250 ml of 1N $NH_4OH$. The mixture was sonicated for 15 minutes and 46.4 ml of stock yttrium nitrate solution providing 6.38 grams of $Y_2O_3$ was added to the $Si_3N_4$ dispersion and was further sonicated for another 15 minutes to ensure homogeneous mixing. The pH of the gelatinous slurry was 9.5. The slurry was diluted with deionized $H_2O$ to 800 ml to reduce the viscosity prior to the spray drying process. The diluted slurry was spray dried at 190° to 200° C. at feed rate of 200 ml/hr. The powder was then calcined at 450° C. for 3 hrs. The chemical analysis of the powder by Ion Coupling plasma technique shows 5.97 w/o of $Y_2O_3$.

The calcined powders were pressed into small pellets, 1.25 cm in diameter, at 210 $MNm^{-2}$ (30,000 psig) in WC dies or isostatically pressed at 170 $MNm^{-2}$ (25,000 psig). The pressed article had a green density of about 65% to 67% of theoretical.

The pressed articles of AY6 and PY6 were then sintered at about 1760° C. for AY6 and 1860° C. for PY6 using a 200 psi $N_2$ overpressure, as compared to conventionally processed powders which have to be sintered at 1850° C. for AY6 and 1900° to 1950° C. for PY6. The sintering schedule began by heating to 1400° C. and holding at that temperature for 1 hour followed by further heating to 1760° C. and holding at that temperature for 2 hours followed by cooling to room temperature. The resulting articles had a density greater than 99% of theoretical.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for making a densified silicon nitride article comprising
    Step 1—dispersing silicon nitride particles in a solution of sintering additives to from a silicon nitride, sintering additive slurry;
    Step 2—adding an ammonium hydroxide solution to said silicon nitride, sintering additive slurry to form a gel;
    Step 3—filtering the product from step 2;
    Step 4—washing the product from step 3 with water;
    Step 5—drying the product from step 4;
    Step 6—calcining the product from step 5 at a temperature sufficient to convert the sintering additives to sintering additive oxides;
    Step 7—forming a silicon nitride article from the product of step 6; and
    Step 8—pressureless sintering the product from step 7 at a temperature sufficient to form a densified silicon nitride article having a density greater than 99 percent of theoretical density.

2. A process for making a densified silicon nitride article in accordance with claim 1 wherein said sintering additives are selected from the group consisting of aluminum nitrate solution, yttrium nitrate solution, and mixtures thereof.

3. A process for making a densified silicon nitride article in accordance with claim 1 wherein said step 6 comprises calcining the product from step 5 at a temperature of about 450° C. for about 4 hours to convert said sintering additives to sintering additive oxides.

4. A process for making a densified silicon nitride article in accordance with claim 1 wherein said step 7 comprises forming by pressing into small pellets a silicon nitride article from the product of step 6.

5. A process for making a densified silicon nitride article in accordance with claim 1 wherein said step 8 comprises pressureless sintering the product from step 7 at a temperature from about 1760° C. to about 1860° C. using about 200 psi nitrogen overpressure to form a densified silicon nitride article having a density greater than 99% of theoretical density.

* * * * *